(12) United States Patent
Lee (10) Patent No.: US 10,884,669 B2
(45) Date of Patent: Jan. 5, 2021

(54) CONTROLLER, OPERATION METHOD OF THE CONTROLLER AND MEMORY SYSTEM

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/778,282

(22) Filed: Jan. 31, 2020

(65) Prior Publication Data

US 2020/0333982 A1    Oct. 22, 2020

(30) Foreign Application Priority Data

Apr. 19, 2019    (KR) .................. 10-2019-0046243

(51) Int. Cl.
  *G11C 16/10*    (2006.01)
  *G06F 3/06*    (2006.01)

(52) U.S. Cl.
  CPC ............ *G06F 3/0659* (2013.01); *G06F 3/064* (2013.01); *G06F 3/0619* (2013.01); *G06F 3/0653* (2013.01); *G06F 3/0679* (2013.01)

(58) Field of Classification Search
  CPC .... G06F 3/0659; G06F 3/0619; G06F 3/0653; G06F 3/064; G06F 3/0679
  See application file for complete search history.

(56) References Cited

U.S. PATENT DOCUMENTS

| | | | |
|---|---|---|---|
| 10,521,136 B2 * | 12/2019 | Kim ...................... | G11C 29/82 |
| 2011/0113208 A1 | 5/2011 | Jouppi et al. | |
| 2017/0075593 A1 | 3/2017 | Kim et al. | |
| 2018/0181326 A1 * | 6/2018 | Kim ...................... | G06F 11/073 |

FOREIGN PATENT DOCUMENTS

| | | |
|---|---|---|
| KR | 10-1470994 | 12/2014 |
| KR | 10-2018-0076715 | 7/2018 |
| KR | 10-2019-0017550 | 2/2019 |

* cited by examiner

*Primary Examiner* — Xiaochun L Chen
(74) *Attorney, Agent, or Firm* — IP & T Group LLP (57) ABSTRACT

A method for operating a controller controlling a memory device, the method includes: obtaining open block information and read counts of open blocks of the memory device; updating each of the read counts by adding a variable value for each open block to each of the read counts; storing the updated read counts in the memory device; and performing a sudden power-off recovery operation on the memory device based on the open block information.

19 Claims, 9 Drawing Sheets

| BLOCK1 | BLOCK2 | BLOCK3 |
|---|---|---|
| DATA | DATA | DATA |
| DATA | DATA | DATA |
| DATA | BOUNDARY PAGE | DATA |
| DATA | ERASED PAGE | DATA |
| DATA | ERASED PAGE | DATA |
| BOUNDARY PAGE | ERASED PAGE | DATA |
| ERASED PAGE | ERASED PAGE | BOUNDARY PAGE |
| ERASED PAGE | ERASED PAGE | ERASED PAGE |

150

CONTROLLER, OPERATION METHOD OF THE CONTROLLER AND MEMORY SYSTEM

CROSS-REFERENCE TO RELATED APPLICATIONS

The present application claims priority of Korean Patent Application No. 10-2019-0046243, filed on Apr. 19, 2019, which is incorporated herein by reference in its entirety.

BACKGROUND

1. Field

Various embodiments of the present invention relate generally to a controller for controlling a memory device and, more particularly, to a controller for controlling a sudden power-off recovery operation.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid-state drives (SSDs).

SUMMARY

Embodiments of the present invention are directed to a controller for controlling a memory device, a method for operating the controller, and a memory system employing the controller. The present invention improves the reliability of data stored in the controller when the controller performs a sudden power-off recovery operation.

In accordance with an embodiment of the present invention, a method for operating a controller controlling a memory device the method includes: obtaining open block information and read counts of open blocks of the memory device; updating each of the read counts by adding a variable value for each open block to each of the read counts; storing the updated read counts in the memory device; and performing a sudden power-off recovery operation on the memory device based on the open block information. A read count of a memory block is the number of read operations performed on the memory block.

In accordance with another embodiment of the present invention, a controller for controlling a memory device includes: a block manager suitable for obtaining open block information and read counts of open blocks of the memory device, updating each of the read counts by adding a variable value for each open block to each of the read counts, and performing a sudden power-off recovery operation on the memory device based on the open block information; and a memory interface unit suitable for controlling the memory device to store the updated read counts before the sudden power-off recovery operation is performed.

In accordance with still another embodiment of the present invention, a memory system comprising: a memory device including a plurality of open blocks; and a controller suitable for: obtaining read counts of the open blocks from the memory device when powered on after a sudden power-off; increasing the read counts by different is values, each value corresponding each open block which is randomly determined in a range; storing the increased read counts in the memory device; and performing a sudden power-off recovery operation on the open blocks based on the increased read counts.

These and other features and advantages of the present invention will become apparent to those with ordinary skill in the art to which the invention belongs or pertains from the following description of detailed embodiments in conjunction with the following figures.

DETAILED DESCRIPTION

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It should be understood that the drawings are simplified schematic illustrations of the described devices and may not include well known details for avoiding obscuring the features of the invention. It should also be noted that features present in one embodiment may be used with one or more features of another embodiment without departing from the scope of the invention.

Hereafter, the embodiments of the present invention are described in detail with reference to the accompanying drawings.

Figure 1:
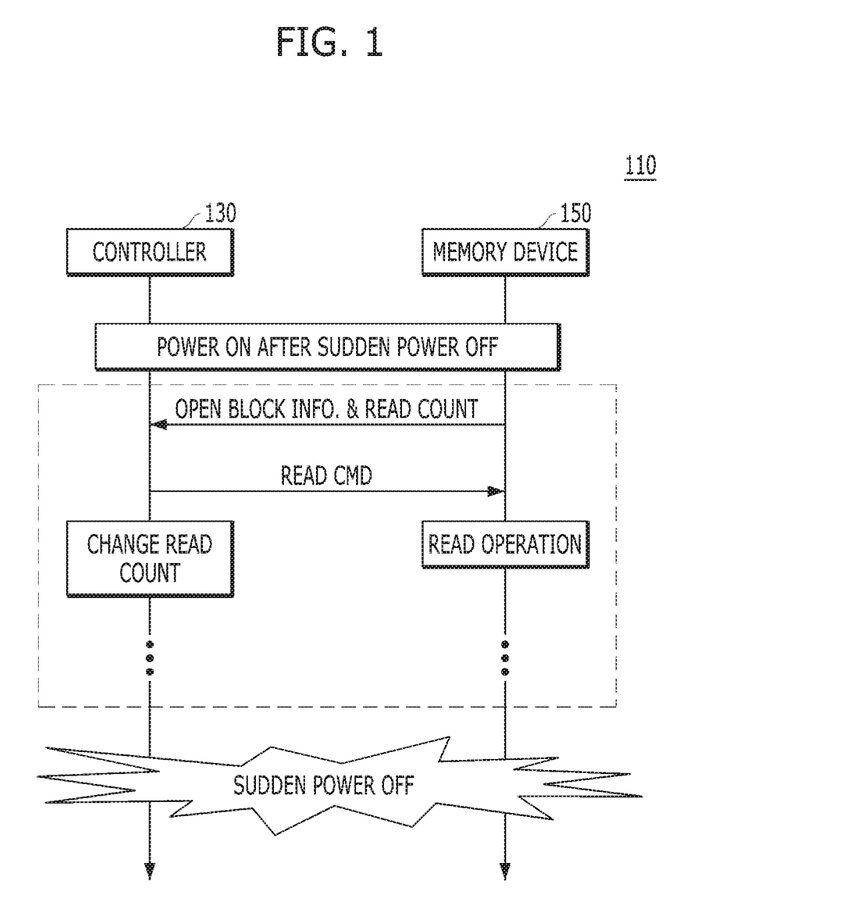
FIG. 1 illustrates an example of an operation of a memory system.

FIG. 1 illustrates an example of an operation of a memory system 110.

Referring to FIG. 1., the memory system 110 may include a memory device 150 and a controller 130 for controlling the memory device 150.

The memory device 150 may include a plurality of non-volatile memory cells. The non-volatile memory cells may have a string structure. A set of memory cells having a string structure may be called a memory cell array. The memory cell array may be formed of a plurality of memory blocks. Each memory block may be formed of a plurality of pages. Each page may be formed of a plurality of memory cells sharing one word line. The memory device 150 may perform an erase operation on a memory block basis. The memory device 150 may perform a read operation and a program operation on a page basis.

When the memory system 110 is rebooted after a sudden power-off, the memory system 110 may perform an operation referred to herein as a sudden power-off recovery operation.

When a power-off occurs in a memory block in which a program operation is being performed, the program operation may be interrupted. Then the memory system 110 may perform a sudden power-off recovery operation by detecting the next page of the lastly programmed page and programming dummy data in the next page.

When the memory system 110 is powered on, the controller 130 may obtain open block information OPEN BLOCK INFO from the memory device 150. The open block information may represent which of the memory blocks in the memory device 150 are open blocks. An open block as the term is used herein refers to a memory block in which a program operation for all memory cells of the memory block has not been completed yet.

The controller 130 may obtain read counts READ COUNT together with the open block information from the memory device 150. When a read operation is performed several times on a memory block, the data stored in the memory block may be distorted due to read disturbance. The controller 130 may perform an operation for maintaining the reliability of the memory system 110 based on the read counts of the memory device 150. For example, the controller 130 may determine that the data of a target memory block whose read count is greater than or equal to a threshold value are not reliable and, thus, the controller may perform a read reclaim operation which includes migrating (copying) the data of the target memory block into another memory block, storing the data therein, and performing an erase operation onto the target memory block. For another example, the controller 130 may determine an open block whose read count is greater than or equal to a threshold value as a closed block, and control a program operation not to be performed onto the memory block. For another example, the controller 130 may control the memory device 150 to perform a read operation with a read voltage which is determined based on the read count of the memory block.

The portion shown by the dashed line in FIG. 1 shows an example of a sudden power-off recovery operation of the memory system 110. The memory system 110 may detect the next page next to the lastly programmed page of one or more open block as part of a sudden power-off recovery operation. The next page may be referred to also as a boundary page.

When the boundary pages of the one or more open blocks are searched, the memory system 110 may perform a read operation of each of the pages to determine whether each page of the open blocks is erased or not. In FIG. 1, the controller 130 may receive open block information and provide the memory device 150 with a read command on an open block. The memory device 150 may perform a read operation in response to the read command. The controller 130 may change the read count of the open block.

The controller 130 may store the changed read count in an internal memory of the controller 130. The internal memory of the controller 130 may be realized as a volatile memory. The controller 130 may store the read counts stored in the internal memory of the controller 130 at a predetermined cycle in the memory device 150 including a non-volatile memory cell. The memory system 110 may lose the changed read count when a sudden power-off occurs before the read count stored in the internal memory is stored in the memory device 150.

When the power supply of the memory system 110 is unstable, sudden power-off may occur repeatedly. A sudden power-off recovery operation may be repeatedly performed in the same memory block due to the repeated sudden power-off. When the sudden power-off occurs before the read count stored in the internal memory of the controller 130 is stored in the memory device 150 whenever the sudden power-off recovery operation is performed, the read count of the read operations performed in the sudden power-off recovery operation may not be reflected into the memory system 110. Even though a read operation is actually performed on a memory block a threshold number of times or more, when the read count stored in the internal memory of the controller 130 does not reach the threshold number, the controller 130 may not perform a read reclaim operation. When the data of the memory block in which the read operation is performed the threshold number of times or more are not migrated into another memory block, the reliability of the data may not be guaranteed due to read disturbance.

According to an embodiment of the present invention, the controller 130 may obtain open block information and the read counts from the memory device 150 when the memory system 110 is powered on after a sudden power-off. The controller 130 may update the read counts of the open blocks in advance based on the open block information and the read counts, store the updated read counts in the memory device 150, and perform an open block scan operation. The controller 130 may reflect the read counts of the open blocks which are changed by the open block scan operation into the memory system 110 even when the sudden power-off occurs repeatedly during a sudden power-off recovery operation. The controller 130 may perform an operation for maintaining the reliability of the data stored in the memory blocks of the memory device 150 based on the changed read counts. Thus, the reliability of the memory system 110 may be improved.

Figure 2:
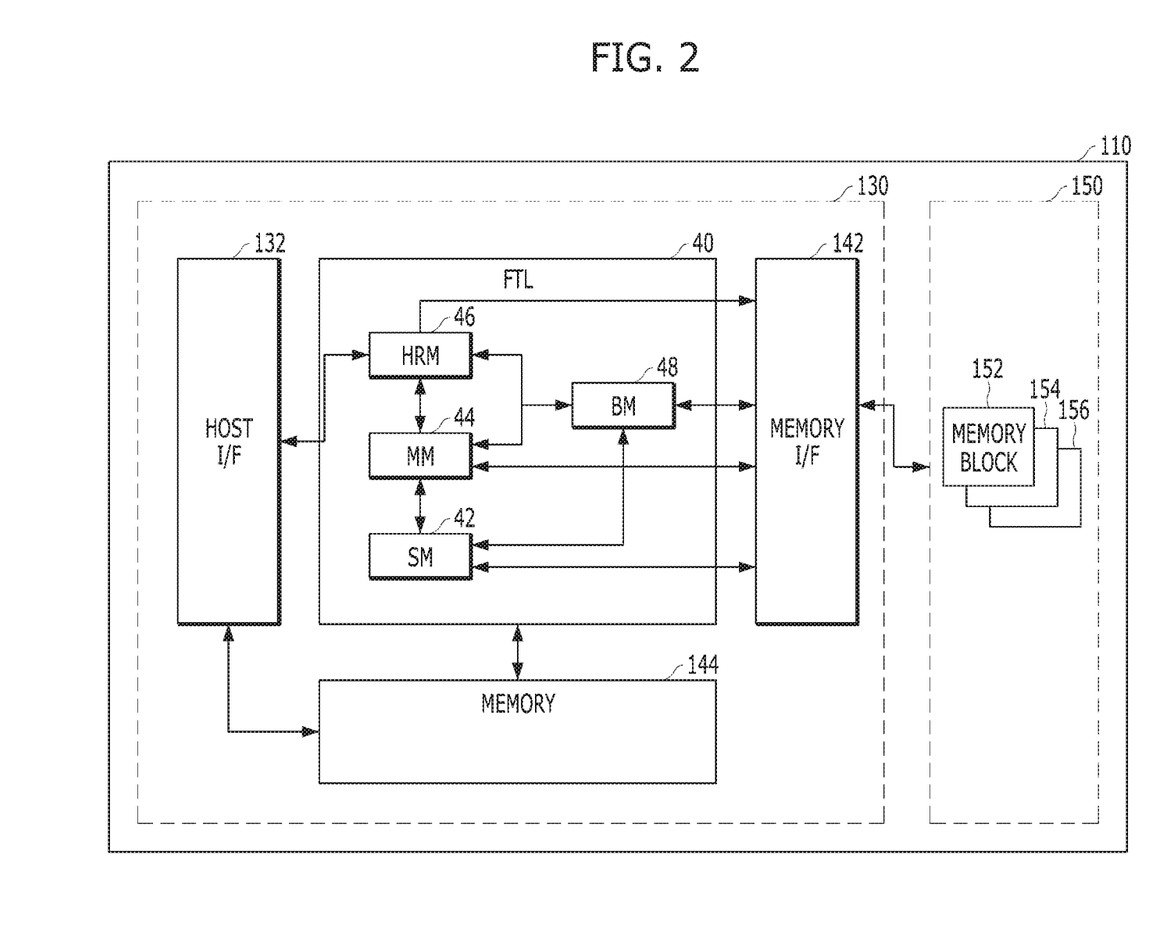
FIG. 2 is a block diagram illustrating a memory system in accordance with an embodiment of the present invention.

FIG. 2 is a block diagram illustrating a memory system 110 in accordance with an embodiment of the present invention.

Referring to FIG. 2, the memory system 110 may include a controller 130 and a memory device 150. The controller 130 may include a host interface (I/F) 132, a flash translation layer (FTL) 40, a memory interface (I/F) 142, and a memory 144 that are interlocked with each other.

The host interface 132 may be configured to process a command and data from a host (not shown). Further, the host interface 132 may communicate with the host through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The memory interface 142 may serve as a memory/storage interface for interfacing the controller 130 and the memory device 150 such that the controller 130 controls the memory device 150 in response to a request from the host. When the memory device 150 is a flash memory or specifically a NAND flash memory, the memory interface 142 may generate a control signal for the memory device 150 and process data to be provided to the memory device 150. The memory interface 142 may work as an interface (e.g., a NAND flash interface) for processing a command and data between the controller 130 and the memory device 150. Specifically, the memory I/F 142 may support data transfer between the controller 130 and the memory device 150.

The FTL 40 may include a host request manager (HRM) 46 for managing host requests received from the host interface 132, a map manager (MM) 44 for managing map data, a state manager (SM) 42 for performing a garbage collection operation or a wear leveling operation, and a block manager (BM) 48 for managing memory blocks and performing an operation according to a command in a memory block in the memory device 150.

For example, the host request manager 46 may process a read request, a write request, and a request based on an event that are received from the host interface 132 using the map manager 44 and the block manager 48. The host request manager 46 may provide the map manager 44 with a search request to detect a physical address corresponding to a logical address associated with the received request and provide the memory interface 142 with a read command for the physical address. Meanwhile, the host request manager 46 may be able to update mapping information between the logical address and the physical address by providing the block manager 48 with a write request to write data into a specific page (i.e., an unrecorded (no-data) page) of the memory device 150 and then providing the map manager 44 with a map update request.

The block manager 48 may convert write requests from the host request manager 46, the map manager 44, and the state manager 42 into program commands for the memory device 150. To maximize the performance of a write operation of the memory system 110, the block manager 48 may collect the write requests and provide the program commands for multiple planes and one-shot program operations to the memory interface 142. Also, various program commands may be provided to the memory interface 142 to maximize the parallel processing of the multi-channel and multi-directional flash controllers.

The block manager 48 may select and erase a block having invalid page when a spare block is needed, and may select a block including the least number of valid pages when a garbage collection operation needs to be performed. The state manager 42 may perform a garbage collection operation to move the valid data into an empty block and erase the blocks the valid data of which are moved into the empty block so that the block manager 48 may have empty blocks sufficiently. When the block manager 48 provides the state manager 42 with information about the block to be erased, the state manager 42 may first check all the flash pages of the block to be erased to determine whether each page is valid or not. For example, in order to determine the validity of each page, the state manager 42 may identify the logical address stored in a spare Out Of Band (OOB) area of each page, and then compare the physical address of the page with the physical address mapped to the logical address obtained from the search request of the map manager 44. The state manager 42 may provide the block manager 48 with program commands of each valid page. When the program operation is completed, the map manager 44 may update a mapping table.

The block manager 48 may manage the memory blocks in such a manner that the data stored in the memory blocks are not damaged. The block manager 48 may perform a sudden power-off recovery operation to prevent the reliability of the data from being degraded due to the sudden power-off. The block manager 48 may perform a read reclaim operation in order to prevent the reliability of the data from being degraded due to read disturbance.

The map manager 44 may manage the mapping table between the logical addresses and the physical addresses and may process requests such as an inquiry request and an update request, which are generated by the host request manager 46 and the state manager 42. The map manager 44 may store the entire map data in the map area of the memory device 150 and may cache at least some map data according to the capacity of the memory 144. When a map cache miss occurs while processing the search and update commands, the map manager 44 may provide the memory interface 142 with a read command to load the map data stored in the memory device 150. When the amount of data cached in the memory 144 exceeds a threshold value, the map manager 44 may provide the block manager 48 with a write command to store the map data cached in the memory 144 in the memory device 150.

When a garbage collection operation is performed, the host request manager 46 may write the latest version of the data for the page having the same logical address and simultaneously provide an update request while the state manager 42 is copying the valid page. The map manager 44 may not update the mapping table when the state manager 42 requests to update the map data in a state in which the copying of the valid page is not normally completed. The map manager 44 may be able to ensure accuracy by performing a map update operation only when the latest map table still indicates the previous physical address.

The memory 144 may serve as a working memory of the memory system 110 and the controller 130, and store data for driving the memory system 110 and the controller 130. The memory 144 may store data required for the controller 130 and the memory device 150 to perform data input and output operation.

The memory 144 may serve as a working memory of the memory system 110 and the controller 130, and store data for driving the memory system 110 and the controller 130. The controller 130 may control the memory device 150 to perform read, program and erase operations in response to a request from the host. The controller 130 may provide data read from the memory device 150 to the host, and may store data provided from the host 102 into the memory device 150. The memory 144 may store data required for the controller 130 and the memory device 150 to perform these operations.

The memory device 150 may include a plurality of memory blocks 152, 154, 156. The plurality of memory blocks may include single level cell (SLC) memory blocks each of which stores one-bit data and multi-level cell (MLC) memory blocks each of which stores data of a plurality of bits. Each of the SLC memory blocks may include a plurality of pages, each of which includes memory cells each of which stores a bit of data. The SLC memory blocks may have high durability and fast data operation performance. On the other hand, each of the MLC memory blocks may include a plurality of pages, each of which includes memory cells each of which stores a multi-bit data, such as two bits of data or more. The MLC memory blocks may have a greater data storage space than the SLC memory blocks. In other words, the MLC memory blocks may be highly integrated.

Each of triple level cell (TLC) memory blocks may include a plurality of pages each of which includes memory cells storing three-bit data in one memory cell. Each of quadruple level cell (QLC) memory blocks may include a plurality of pages each of which includes memory cells storing four-bit data in one memory cell. The MLC, TLC, and QLC memory blocks may store a large amount of data in the same area compared with the SLC memory blocks.

The memory device 150 may be embodied by a two-dimensional (2D) or three-dimensional (3D) memory device. Each memory block in the memory device 150 may include a plurality of NAND strings NS that are extended in the second direction, and a plurality of NAND strings NS (not shown) that are extended in the first direction and the third direction. Each of the NAND strings NS may be coupled to a bit line BL, at least one drain selection line DSL, at least one source selection line SSL, a plurality of word lines WL, at least one dummy word line DWL (not shown), and a common source line CSL. Each of the NAND strings NS may include a plurality of transistor structures.

Figure 3:
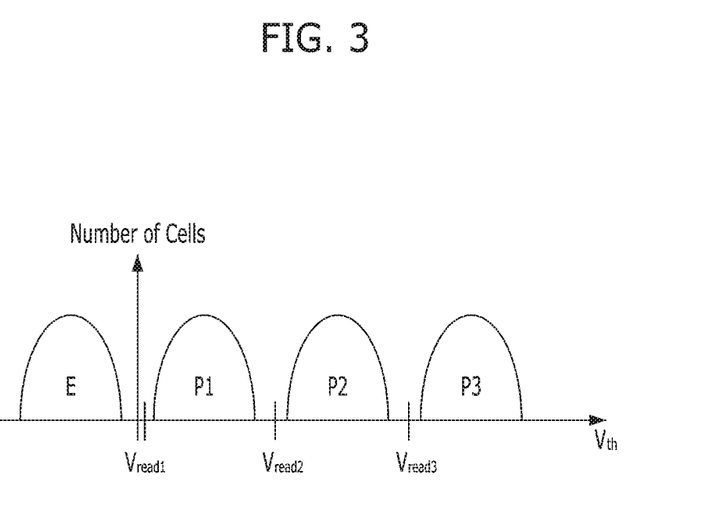
FIG. 3 illustrates threshold voltage distributions of memory cells in a memory device in accordance with an embodiment of the present invention.

FIG. 3 illustrates threshold voltage distributions of memory cells in the memory device 150.

Referring to FIG. 3, the memory device 150 may program data by applying voltages to word lines and bit lines connected to memory cells to be programmed in response to a write command. Unprogrammed memory cells may have threshold voltage distribution of an erase state E. As voltages are applied to word lines and bit lines connected to the memory cells to program data, the memory cells may have a target threshold voltage distribution.

When a multi-level memory cell is programmed, the multi-level memory cell may have any one threshold voltage distribution of program states P1, P2, P3 and the erase state E, depending on data to be programmed. When a voltage supply applies a read voltage Vread1, Vread2 or Vread3 to a word line coupled to the memory cell, the amount of current flowing through a bit line may be changed depending on the threshold voltage of the memory cell, such that the state of the memory cell is divided into each threshold voltage states.

Figure 4:
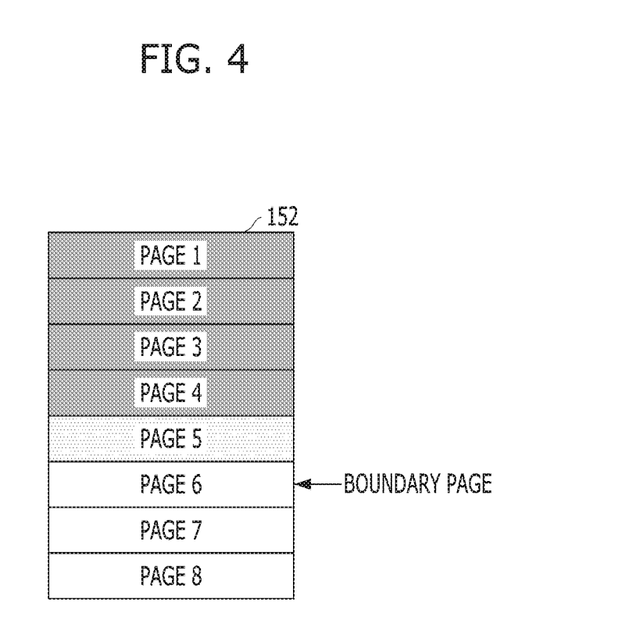
FIG. 4 illustrates a memory block in a memory device in accordance with an embodiment of the present invention.

FIG. 4 illustrates a memory block 152 in the memory device 150 of FIG. 2.

Referring to FIG. 4, the memory block 152 may include eight pages PAGE 1 to PAGE 8. FIG. 4 exemplarily illustrates a memory block 152 at the moment when a sudden power-off occurs. The memory block 152 may be an open block where no memory cells are programmed. The first to fourth pages PAGE 1 to PAGE 4 of the memory block 152 may be pages in which a program operation is completed. The sixth to eighth pages PAGE 6 to PAGE 8 may be erased pages that are not programmed. The fifth page PAGE 5 may be the lastly programmed page. The program operation of the fifth page PAGE 5 may have been completed before the sudden power-off occurs, or may have been performed at the moment when the sudden power-off occurs.

In another case, the program operation may be terminated while the memory cells of the fifth page PAGE 5 do not reach a target threshold voltage. In this case, the reliability of the data stored in the fifth page PAGE 5 is not ensured. However, even though there is a page including a reliable memory block, the memory system 110 may be able to use the remaining erase pages by programming the boundary page with dummy data. In the example of FIG. 4, the memory system 110 may program the dummy data into the next page of the fifth page PAGE 5 of the memory block 152, which is a sixth page PAGE 6 as a boundary page. The memory system 110 may also be designed to further perform an operation of copying the data of the fifth page PAGE 5 into a seventh page PAGE 7.

Figure 5:
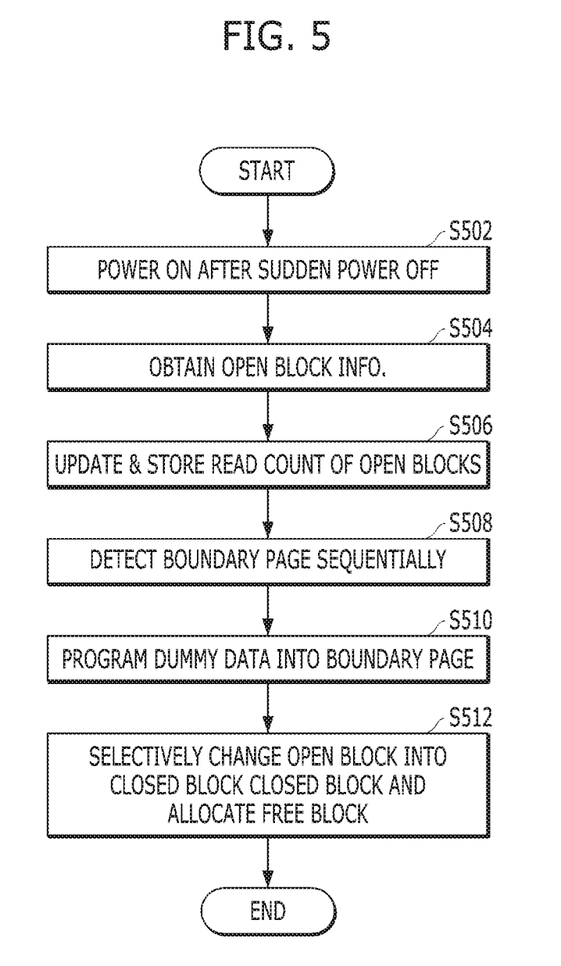
FIG. 5 is a flowchart illustrating a sudden power-off recovery operation of a memory system in accordance with an embodiment of the present invention.

FIG. 5 is a flowchart illustrating a sudden power-off recovery operation of the memory system 110 in accordance with an embodiment of the present invention.

Referring to FIG. 5, when the power is turned on after sudden power-off in step S502, the block manager 48 may acquire the open block information stored in the memory device 150 via the memory interface 142 in step S504.

In step S506, the block manager 48 may update the number of read operations that are expected to be performed in step S508, into the read counts of the open blocks based on the open block information and store the updated read counts in the memory device 150.

In step S508, the block manager 48 may be able to detect a boundary page by sequentially reading the pages included in each of the open blocks based on the open block information.

The order of reading the pages may be determined in advance according to how the controller 130 is designed. For example, the block manager 48 may perform an open block scan operation based on a linear search scheme. The linear search scheme may include detecting a boundary page by performing a read operation onto the pages of an open block in the order that the pages are arranged or in the reverse order of the order that the pages are arranged. As another example, the controller 130 may perform an open block scan operation based on a binary search scheme. The binary search scheme may include detecting a boundary page by narrowing the range of the pages to be searched based on the result of performing a read operation of the page located at an intermediate position among the pages to be searched.

In step S510, the block manager 48 may provide the memory device 150 with a program command to program dummy data into the boundary page of each of the open blocks.

In step S512, the block manager 48 may selectively change at least one open block among the open blocks into a closed block based on the read counts of the open blocks, and allocate a free block instead of the open blocks. The operation of step the S510 may be described with reference to FIGS. 6A to 7.

Figure 6A:
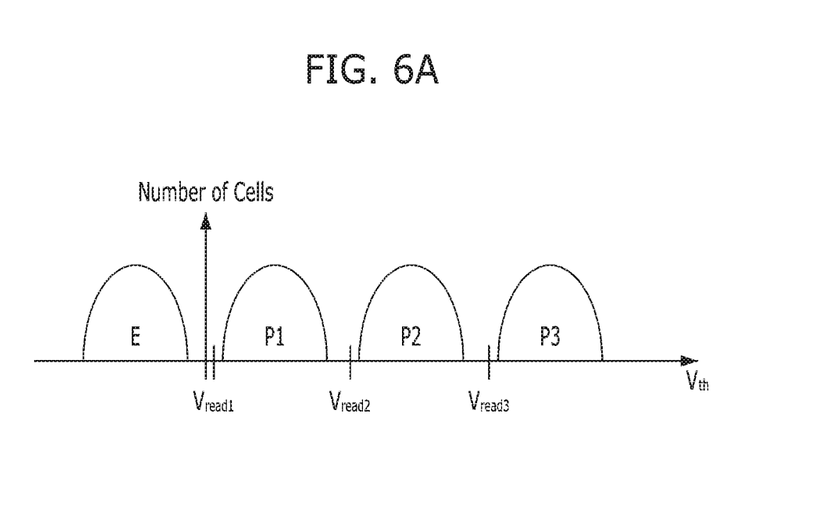
FIGS. 6A and 6B show threshold voltage distributions of memory cells in a memory device in accordance with an embodiment of the present invention.
Figure 6B:
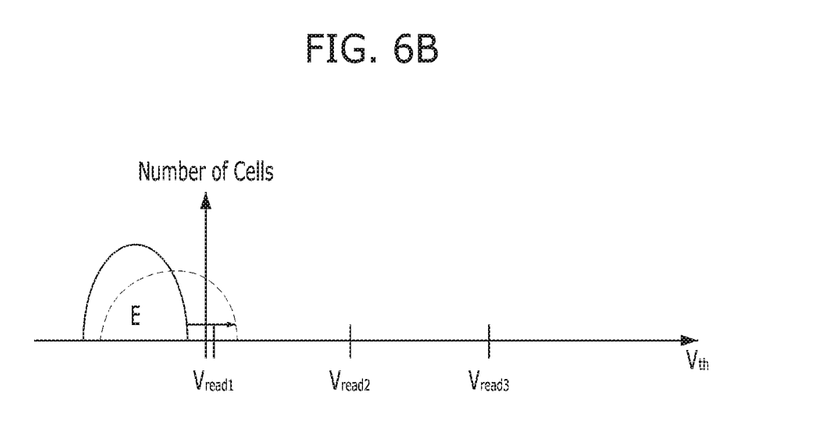

FIGS. 6A and 6B show threshold voltage distributions of the memory cells in the memory device 150. FIGS. 6A and 6B illustrate threshold voltage distributions of MLCs as an example, but the present invention may be applied to all cases where one memory cell may store data of more than one bit.

FIG. 6A illustrates a threshold voltage distribution that the programmed MLCs may have. The threshold voltages of the memory cells that are programmed with the same data may have a certain range of threshold voltage distribution due to the difference in the delicate electrical characteristics between the memory cells. For example, when an MLC is programmed, the MLC may have one state among three program states P1 to P3 and one erase state E.

The memory device 150 may apply a pass voltage to an unselected word line when performing a read operation, so that a read disturbance in which the threshold voltage of an adjacent memory cell rises may occur. When the read operation is repeated, the read disturbance may be deepened and the threshold voltage of the memory cell may be greatly changed.

FIG. 6B illustrates a threshold voltage distribution that the MLCs in an erase state E may have. The threshold voltage distribution shown by a solid line in the graph of FIG. 6B may represent an ideal threshold voltage distribution.

The open block may be a memory block in which a program operation for all memory cells is not completed. The open block may include memory cells in an erase state E. When the memory cells of the open block are read, the threshold voltage distribution of the memory cells in the erase state E may be distorted due to disturbance. When the threshold voltage of the memory cells in the erase state E rises, the memory cells in the erase state E may be recognized as being in a program state. The threshold voltage shown by the dotted line in the graph of FIG. 6B may represent a distorted threshold voltage distribution which is formed due to the disturbance.

When data are programmed in the memory cells of the erase state E whose threshold voltage distribution is distorted and the data are read, an error that may not be corrected even by an error correction decoding may occur.

The controller 130 may determine the open block as a closed block based on the read count of the open block in the memory device 150 to protect the data from being damaged due to the disturbance of the memory cells in the erase state, and may not perform a program operation any more.

Figure 7:
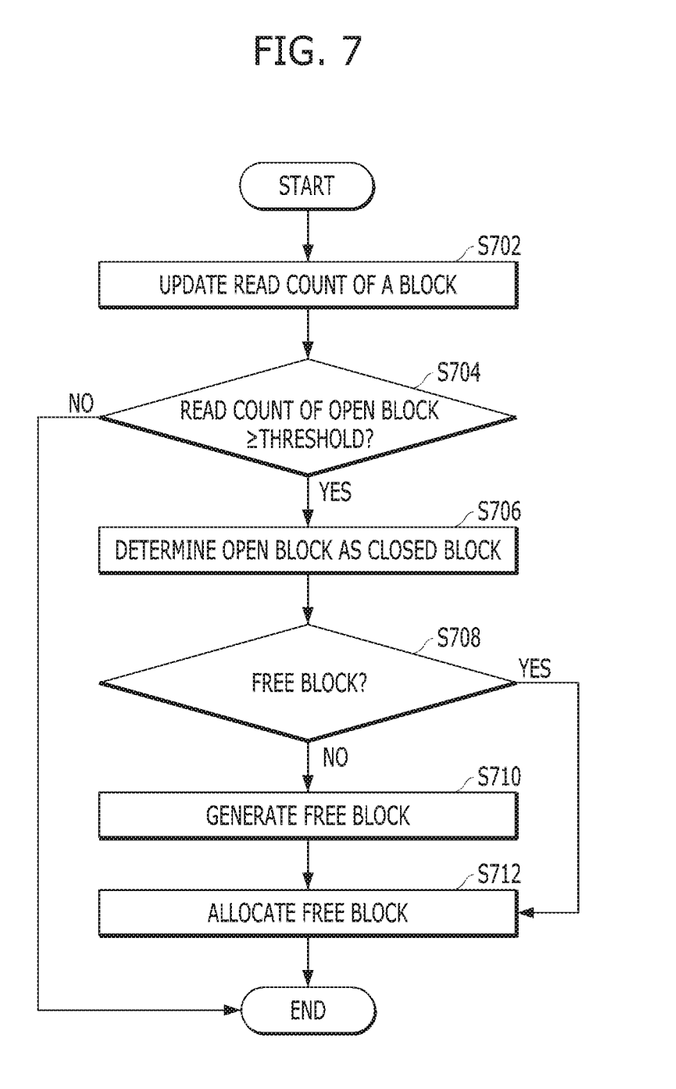
FIG. 7 is a flowchart illustrating an operation of the memory system 110 in accordance with an embodiment of the present invention.

FIG. 7 is a flowchart illustrating an operation of the memory system 110.

Referring to FIG. 7, in step S702, the block manager 48 may update a read count of a memory block, which is the number of read operations performed on the memory block. For example, the step S702 may include step S506 of FIG. 5. For example, the block manager 48 may update the read count in response to a read command of the memory block when a sudden power-off recovery operation is not performed.

In step S704, the block manager 48 may determine whether the read count of an open block is greater than or equal to a threshold value. For example, the block manager 48 may perform the operation of the step S704 after performing the operations of the steps S508 to S510 in FIG. 5. When the block manager 48 does not perform a sudden power-off recovery operation and when the memory block whose read count is updated in the step S702 is an open block, the block manager 48 may perform the operation of the step S704.

When the read count of an open block is less than the threshold value ('NO' in the step S704), the block manager 48 may terminate the operation.

When the read count of the open block is greater than or equal to the threshold value ('YES' in the step S704), the block manager 48 may prevent a program operation from being performed on the open block by determining the open block as a closed block in step S706.

In step S708, the block manager 48 may determine whether the memory device 150 has a free block or not. A free block may refer to a memory block in which all the memory cells are not programmed yet.

When there is a free block in the memory device 150 ('YES' in the step S708), the block manager 48 may allocate the free block instead of the open block which is determined as the closed block, in step S712. For example, when the read count of the open block for programming user data becomes greater than or equal to the threshold value, the open block may be determined as a closed block, and the free block may be allocated to program the user data therein.

When there is no free block in the memory device 150 ('NO' in the step S708), the block manager 48 may generate a free block in step S710. In one example, the block manager 48 may control the memory device 150 to erase a memory block that stores only invalid data. The block manager 48 may then perform the operation of step S712.

Figure 8:
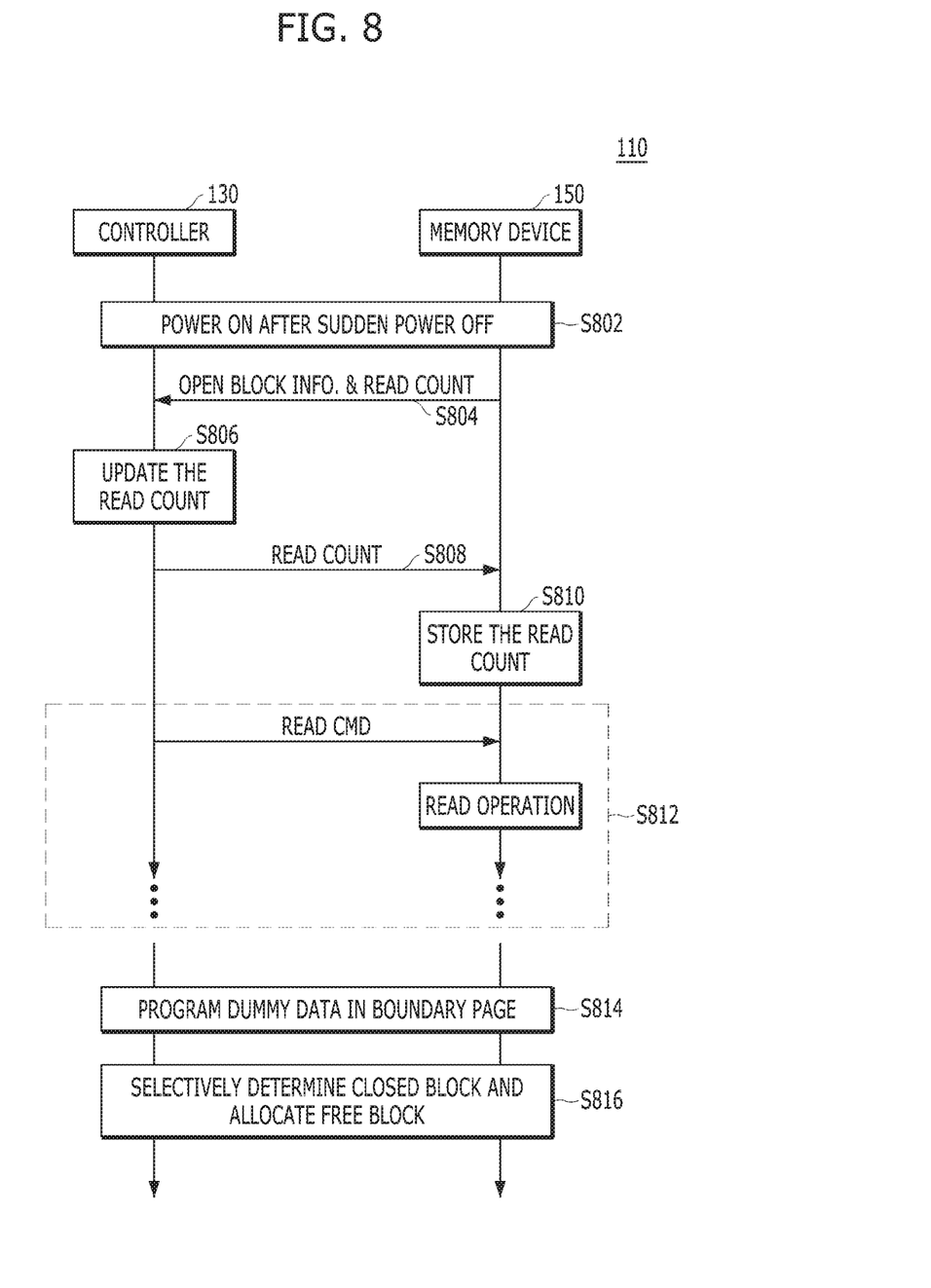
FIG. 8 is a diagrammatic illustration of a method of performing a sudden power-off recovery operation of a memory system in accordance with an embodiment of the present invention.

FIG. 8 is a diagram illustrating a method of performing a sudden power-off recovery operation of the memory system 110 in accordance with an embodiment of the present invention.

Referring to FIG. 8, when the memory system 110 is powered on after sudden power-off in the step S802, the block manager 48 may obtain open block information and a read count from the memory device 150 in step S804.

In step S806, the block manager 48 may update the read count by adding a variable value to the read count of each open block. The block manager 48 may reflect the number of the read operations that are expected to be performed in a subsequent step S812 in advance by updating the read count. The variable value may be determined in various ways according to how the block manager 48 is designed, and diverse examples will be described later with reference to FIG. 9.

In step S808, the block manager 48 may provide the memory device 150 with a program command via the memory interface 142 to store the updated read count in the memory device 150. In step S810, the memory device 150 may store the updated read count in a memory block in response to the program command. The updated read count may not be volatilized even though sudden power-off occurs again after the step S810.

In steps S812 to S816, the block manager 48 may perform a sudden power-off recovery operation.

In step S812, the block manager 48 may control the read operation on the memory device 150 to perform an open block scan operation. Since the block manager 48 has updated the read count of each of the open blocks in advance in the steps S806 to S810, the block manager 48 may not update the read count of each of the open blocks when a read operation is performed in step S812.

In step S814, the block manager 48 may control the memory device 150 to program dummy data in a boundary page of each of the open blocks. The operation of the step S814 may correspond to the operation of the step S508.

In step S816, the block manager 48 may selectively determine an open block as a closed block, and allocate a free block instead of the open block. The step S816 may correspond to the step S510 in FIG. 5, and may include the steps S704 to S712. In other words, when there is an open block whose read count is greater than or equal to a threshold value based on the read counts of the open blocks that are updated in the step S806, the block manager 48 may determine the open block as a closed block and allocate a free block instead of the closed block. When there is no free block in the memory device 150, the block manager 48 may be able to generate a free block.

In accordance with an embodiment, the block manager 48 may update the read count, which is the number of read operations that are expected to be changed due to a sudden power-off recovery operation, before a sudden power-off recovery operation is performed, and store the updated read count in the memory device 150. The block manager 48 may more accurately determine the reliability of the data stored in the open block based on the updated read count even though sudden power-off occurs repeatedly in the memory system 110. The block manager 48 may perform a memory block management operation, such as a read reclaim operation, based on the updated read count. Thus, the reliability of the memory system 110 may be improved. Hereinafter, a method for determining a variable value for updating the read count for each open block will be described.

Figure 9:
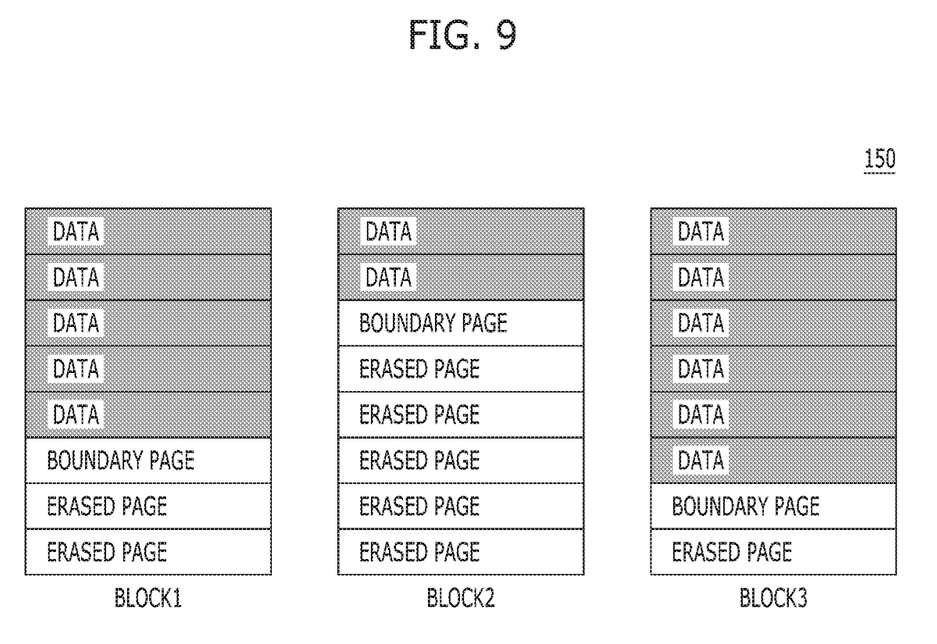
FIG. 9 illustrates open blocks of a memory device in accordance with an embodiment of the present invention.

The memory system 110 of FIG. 2 may be designed to have a plurality of open blocks concurrently during an operation of the memory system 110. For example, the memory device 150 may include user blocks for storing user data, map blocks for storing map data, and history blocks for storing history data. Since the controller 130 can store all the user data, map data, and history data during the operation of the memory system 110, the memory device 150 may determine one of the user blocks, one of map blocks, and one of history blocks as open blocks as shown in FIG. 9. FIG. 9 illustrates a case where the memory device 150 includes three open blocks BLOCK1, BLOCK2, and BLOCK3.

According to what is described above with reference to FIGS. 7 and 8, the block manager 48 may determine the open block whose read count is greater than or equal to the threshold value as a closed block based on the updated read count of the open blocks in the step S806, and allocate free blocks instead of the open blocks. When the block manager 48 updates the read count by adding a set value for each open block in the step S806, the read counts of the open blocks may uniformly increase and a plurality of open blocks whose read counts simultaneously reach a threshold value may be generated. When there are no free blocks in the memory device 150, the block manager 48 may perform an erase operation on a plurality of memory blocks to generate a plurality of free blocks for replacing the open blocks. When there is a plurality of open blocks whose read counts simultaneously reach a threshold value while a sudden power-off recovery operation is being performed, the memory system 110 may perform an erase operation on the memory blocks and thereby the time taken for performing the sudden power-off recovery operation may become long.

According to the embodiment, the block manager 48 may update the read count by adding a variable value which is determined for each open block to the read count of each of the open blocks before a sudden power-off recovery operation is performed. When the block manager 48 determines a variable value for each open block, the variable value added to the number of reads (i.e., read counts) during the sudden power off recovery operation may be different for each open block. When the block manager 48 updates the read count of each open block by adding a variable value to each open block, the read count of each open block does not increase uniformly. Therefore, it is possible to reduce the occurrence of a case where the read counts of a plurality of open blocks simultaneously reach the threshold value. According to the embodiment, since the time required for a sudden power-off recovery operation of the memory system 110 is not elongated, it is possible to provide users with improved performance.

According to the embodiment, the block manager 48 may randomly determine the variable value for each open block between a predetermined upper limit and a predetermined lower limit whenever a sudden power-off recovery operation is performed.

The lower limit of the variable value may be determined as the maximum read count, which is the maximum number of read operations that may be performed onto one open block in a sudden power-off recovery operation. Or the lower limit of the variable value may be determined as the average read count, which is the average number of read operations that may be performed onto one open block in a sudden power-off recovery operation. The maximum read count may be the maximum number of read operations according to the search scheme for detecting a boundary page. For example, when a boundary block of a memory block including 2n pages is detected based on the linear search scheme, the lower limit of the variable value may be determined as 2n. When a boundary block of a memory block including 2n pages is detected based on the binary search scheme, the lower limit of the variable value may be determined as n.

The upper limit of the variable value may be determined based on the lower limit of the variable value. For example, the upper limit of the variable value may be determined to be greater than the sum of the lower limit of the variable value and the number of the open blocks in order to vary the variable value to be added to each open block.

According to an embodiment, the block manager 48 may determine the variable value such that the variable value gradually increases in an order that is determined based on the identifier of each open block. For example, the block manager 48 may determine the variable value to gradually increase in the order of a first block BLOCK1, a second block BLOCK2, and a third block BLOCK3. The block manager 48 may change a value for updating the read count by periodically changing the order that is determined based on the identifier of each open block. For example, when sudden power-off occurs consecutively a predetermined number of times or more, the variable value may be determined to gradually increase in the order of the second block BLOCK2, the third block BLOCK3, and the first block BLOCK1. The lower limit of the variable value may be the maximum read count or the average read count of the read operations that may be performed onto one open block in the sudden power-off recovery operation. The block manager 48 may be able to determine the variable value to have a value gradually increasing from a lower limit of the variable value by a predetermined value in an order that is determined based on the identifier of each open block.

According to an embodiment, the memory system 110 may update the read count of read operations which are expected to be performed in a sudden power-off recovery operation before or after a sudden power-off recovery operation is performed and store the updated read count in the memory device 150. Even when sudden power-off occurs while the memory system 110 performs a sudden power-off recovery operation, the updated read count may not be volatilized. Therefore, even when sudden power-off repeatedly occurs during the sudden power-off recovery operation of the memory system 110, it is possible to reflect the read count of the open block that is changed during the sudden power-off recovery operation.

According to an embodiment, the memory system 110 may update the read count of each open block by adding a variable value determined for each open block to the read count of each open block. The memory system 110 may be able to decrease the number of times that the read counts of the open blocks simultaneously reach a threshold value by preventing the read count of each open block from increasing uniformly.

According to an embodiment of the present invention, even when the power supply of the memory system is unstable, the controller may be able to accurately determine the extent of data loss of the memory device and perform an operation for maintaining the reliability of the data.

The effects that may be obtained by the technology of the present invention are not limited to the effects mentioned above, and it is obvious to those with ordinary skill in the art to which the present invention belongs or pertains that there may be other effects not mentioned in the following specification.

While the present invention has been described with respect to specific embodiments, it will be apparent to those skilled in the art that various changes and modifications may be made without departing from the spirit and scope of the invention as defined in the following claims.

What is claimed is:

1. A method for operating a controller controlling a memory device, the method comprising:
    obtaining open block information and read counts of open blocks of the memory device;
    updating each of the read counts by adding a variable value for each open block to each of the read counts;
    storing the updated read counts in the memory device; and
    performing a sudden power-off recovery operation on the memory device based on the open block information.

2. The method of claim 1, wherein the sudden power-off recovery operation is performed without updating the read counts of the open blocks.

3. The method of claim 1, wherein a lower limit of the variable value includes a maximum read count of read operations that are to be performed in one open block in the sudden power-off recovery operation.

4. The method of claim 3, wherein the maximum read count of the read operation includes the maximum read count based on a search scheme for detecting a boundary page of each open block.

5. The method of claim 4, wherein the search scheme includes a linear search scheme.

6. The method of claim 4, wherein the search scheme includes a binary search scheme.

7. The method of claim 3, further comprising:
    randomly determining the variable value for each open block between the lower limit of the variable value and an upper limit of the variable value.

8. The method of claim 3, further comprising:
    determining the variable value to gradually increase from the lower limit of the variable value in an order determined based on an identifier of each open block.

9. The method of claim 1, wherein the performing of the sudden power-off recovery operation includes:
    sequentially reading pages included in each of the open blocks to detect a boundary page;
    controlling the memory device to program dummy data in the boundary page; and
    selectively determining at least one open block among the open blocks as a closed block based on the updated read counts and allocating a free block instead of the open block determined as the close block.

10. A controller for controlling a memory device, comprising:
    a block manager suitable for obtaining open block information and read counts of open blocks of the memory device, updating each of the read counts by adding a variable value for each open block to each of the read counts, and performing a sudden power-off recovery operation on the memory device based on the open block information; and
    a memory interface suitable for controlling the memory device to store the updated read counts before the sudden power-off recovery operation is performed.

11. The controller of claim 10, wherein the block manager performs the sudden power-off recovery operation without updating the read counts of the open blocks.

12. The controller of claim 10, wherein a lower limit of the variable value includes a maximum read count of read operations that are to be performed in one open block in the sudden power-off recovery operation.

13. The controller of claim 12, wherein the maximum read count of the read operation includes the maximum read count based on a search scheme for detecting a boundary page of each open block.

14. The controller of claim 13, wherein the search scheme includes a linear search scheme.

15. The controller of claim 13, wherein the search scheme includes a binary search scheme.

16. The controller of claim 10, wherein the block manager randomly determines the variable value for each open block between the lower limit of the variable value and an upper limit of the variable value.

17. The controller of claim 12, wherein the block manager determines the variable value to gradually increase from the lower limit of the variable value in an order determined based on an identifier of each open block.

18. The controller of claim 10, wherein the block manager performs a sudden power-off recovery operation by
    sequentially reading pages included in each of the open blocks to detect a boundary page,
    controlling the memory device to program dummy data in the boundary page, and
    selectively determining at least one open block among the open blocks as a closed block based on the updated read counts and allocating a free block instead of the open block determined as the close block.

19. A memory system comprising:
    a memory device including a plurality of open blocks; and
    a controller suitable for:
    obtaining read counts of the open blocks from the memory device when powered on after a sudden power-off;
    increasing the read counts by different values, each value corresponding each open block which is randomly determined in a range;
    storing the increased read counts in the memory device; and
    performing a sudden power-off recovery operation on the open blocks based on the increased read counts.

* * * * *